United States Patent [19]
Kashio

[11] 3,764,791

[45] Oct. 9, 1973

[54] NUMBER INPUT DEVICE USING A MULTI-ZERO INPUT KEY

[75] Inventor: Toshio Kashio, Yamato-shi, Tokyo, Japan

[73] Assignee: Casio Computer Co., Ltd., Tokyo, Japan

[22] Filed: Feb. 22, 1972

[21] Appl. No.: 228,252

[30] Foreign Application Priority Data

Feb. 24, 1971 Japan .................................. 44/8630

[52] U.S. Cl. .................. 235/156, 235/160, 340/365

[51] Int. Cl. ................................................ G06f 7/38

[58] Field of Search .................... 235/152, 156, 160, 235/159, 164, 168, 145 R, 92 AC; 340/172.5, 365

[56] References Cited

UNITED STATES PATENTS

| | | | |
|---|---|---|---|
| 3,597,600 | 8/1971 | Herendeen | 235/156 |
| 3,526,356 | 9/1970 | Hesse et al. | 235/145 R |
| 3,342,979 | 9/1967 | Wright et al. | 235/92 AC |
| 3,500,027 | 3/1970 | Wyle | 235/160 X |
| 3,612,846 | 10/1971 | Drage | 235/168 |
| 3,629,564 | 12/1971 | Drage | 235/160 |
| 3,639,743 | 2/1972 | Kitz | 235/160 |

*Primary Examiner*—Joseph F. Ruggiero
*Attorney*—Irving M. Weiner et al.

[57] ABSTRACT

A number input device for supplying a carry signal to a carry control circuit in controlling the carry of input numbers representing consecutive orders by single key operation, wherein there are generated by key means signals of input numbers representing prescribed consecutive orders. Said input key signals are conducted through a timing circuit to a carry signal generating circuit including a delay shift register which is operated by output from a clock pulse generator as well as by input key signals controlled in timing by output from said clock pulse generator, so as to supply a carry signal to the first one of the respective bits. The bit from which there is obtained a final carry signal by said carry signal generating circuit is connected in series to another bit from which there is successively produced a function signal.

4 Claims, 2 Drawing Figures

A NUMBER INPUT DEVICE USING A MULTI-ZERO INPUT KEY

This invention relates to a number input device for supplying a carry signal to a carry control circuit in controlling the carry of input numbers representing consecutive orders by single key operation and more particularly to a type which produces a function signal in succession to a final carry signal.

In general business calcuation using an electronic calculator, input numbers very often include numbers representing consecutive orders, for example, 1,000 or 500. Namely, it is rare that input numbers initially consist of, for example, 1,001 or 5,002. Accordingly, a ten-key type input number system is provided with a three-zero key or two-zero key to simplify key operation so as to realize the same effect as depressing the zero key two or three times simply by depressing it only once.

Where there is used said three-zero key or two-zero key during the arithmetic operation of a program to indicate the last group of orders of a given number, it is often required subsequently to operate keys associated with signals commanding functions, such as (+), (−), (×) and (÷). The conventional electronic calculator, therefore, is, as is usually the case, additionally provided with keys for generating particular function signals, presenting the drawback, for example, that key operation is complicated and has to be carried out many times.

It is accordingly the object of this invention to provide a number input device which generates a carry signal by depressing a multizero input key and subsequently a function signal.

To attain the above object, the number input device of this invention comprises a delay shift register for generating signals by a single key operation so as to carry input numbers in turn, the final bit of said shift register being connected in series to another bit such that there is produced a program processing signal consecutively upon generation of a carry signal from said final bit. Therefore, this invention eliminates the necessity of operating a function signal key until a certain portion of an input number is fully carried, thereby further simplifying key operation that has been possible in the past.

The present invention can be more fully understood from the following detailed description when taken in connection with reference to the accompanying drawing, in which.

Figure 1:
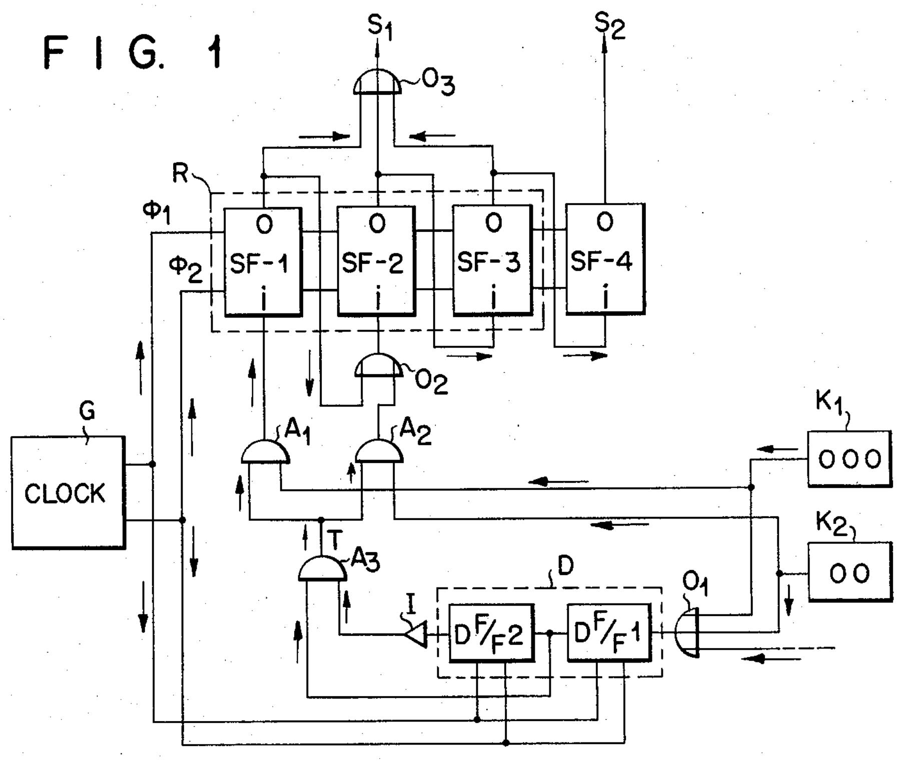
FIG. 1 is a circuit diagram according to an embodiment of this invention.

The present invention will now be described with by reference to the appended drawing. Referring to FIG. 1, the terminal from which there is generated an input by operation of a three-zero key $K_1$ is connected to an input terminal of an AND circuit A, and of an OR circuit $O_1$. The terminal from which there is produced an input by operation of a two-zero key $K_2$ is connected to an input terminal of an AND circuit $A_2$ and of said OR circuit $O_1$. As used herein, the three-zero key is a device for generating input signals so as to carry input numbers representing three consecutive orders in succession by a single operation of said three-zero key. Likewise, the two-zero key is a device for generating input signals so as to carry input numbers denoting two orders. The output terminal of the OR circuit $O_1$ is connected to one input terminal of an AND circuit $A_3$ through an input delay timing control circuit D consisting of delay type flip-flop circuits D F/F.1 and D F/F.2 as well as through an inverter I. The other input terminal of said AND circuit $A_3$ is connected to the junction of said delay flip-flop circuits D F/F.1 and D F/F.2. The output terminal of said AND circuit $A_3$ is connected to the other input terminals of said AND circuits $A_1$ and $A_2$, respectively. The carry signal generating circuit R used in this invention is constituted by a shift register whose bits consist of series-connected delay flip-flop circuits having the same number as that of consecutive orders represented by input numbers. The shift register used in the embodiment of FIG. 1 comprises delay flip-flop circuits SF−1, SF−2 and SF−3 from which there are successively generated signals for carrying input numbers of at least three orders. It will be apparent that the number of orders represented by input numbers may be increased by addition of delay flip-flop circuits.

According to the above embodiment, said carry signal circuit means R and a flip-flop circuit SF−4 connected to the third one SF−3 of said circuit means R jointly constitute a two-phase dynamic delay type shift register of four bits.

The carry signal circuit means R is actuated by a read-in clock pulse $\phi_1$ and a read-out clock pulse $\phi_2$ both generated by a clock pulse generator G. These clock pulses $\phi_1$ and $\phi_2$ are produced at a sufficient interval to carry input numbers representing the consecutive orders one at a time. The output terminals of the clock pulse generator G are connected to the input clock pulse terminals of the flip-flop circuits D F/F.1 and D F/F.2 for operation of the input delay timing control circuit D consisting of said flip-flop circuits D F/F.1 and D F/F.2.

The output terminals of the respective bits of the carry signal circuit means R are connected to the input terminals of an OR gate circuit $O_3$ so as to supply a carry signal to a carry control circuit (not shown). To the terminal *i* of the first bit flip-flop circuit SF−1 is connected the output terminal of the AND circuit $A_1$. To the terminal *i* of the second bit flip-flop circuit SF−2 are connected through the OR circuit $O_2$ the output terminals of the first bit flip-flop circuit SF−1 and of the AND circuit $A_2$. The output terminal of the second bit flip-flop circuit SF−2 is connected to the terminal i of the third bit flip-flop circuit SF−3 which in turn is connected to the terminal i of the last flip-flop circuit SF−4, which supplies a program processing circuit (not shown) with a command signal $S_2$.

There will now be described the operation of this invention by reference to the wave form diagram or timing chart of FIG. 2. There is taken the example where there is processed an addition program "18,000 + 14,000 + 125 =". Where such program is to be processed, the conventional calculator is operated by successively depressing the keys representing

[1], [8], [000], [P], [1], [4], [000], [P], [1], [2], [5], [P]

(P denotes a program processing key). In contrast, the calculator incorporating the present invention has only to be operated by successively depressing the keys representing

Figure 2:
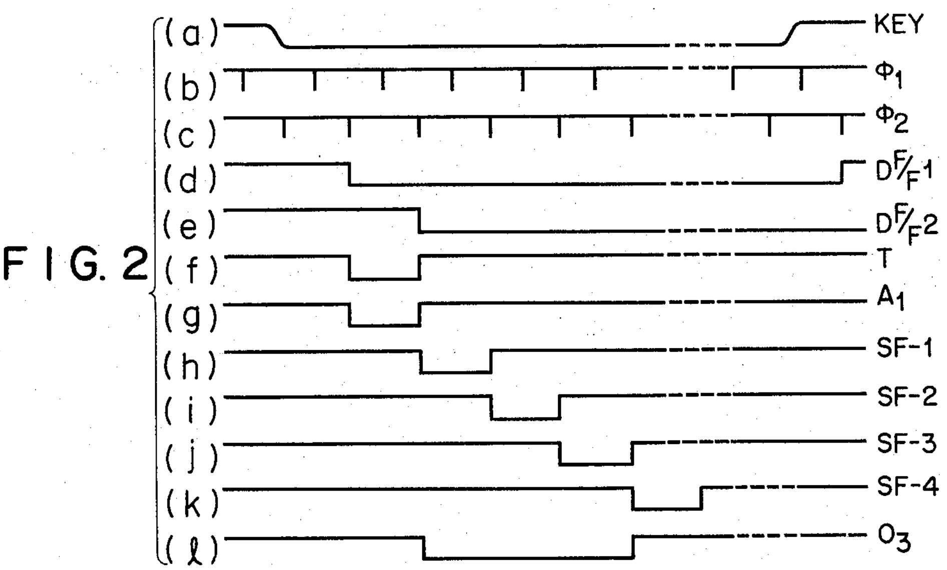
FIG. 2 is a chart showing the timing schedule of said embodiment.

[1], [8], [000], [1], [4], [000], [1], [2], [5], [P], requiring less key depressions than is required for the prior art apparatus.

Where there is depressed the three-zero key after the input number keys [1] and [8], then said key generates a signal having a wave form indicated by FIG. 2(*a*) and supplies it to the AND circuit $A_1$ and OR circuit $O_1$. The clock pulse generator G produces clock pulses $\phi_1$ and $\phi_2$ at an interval defined between FIG. 2(*b*) and 2(*c*) and supplies them to the flip-flop circuits D F/F.1 and D F/F.2 constituting the input delay timing control circuit D. Upon receipt of output from the OR circuit $O_1$, the flip-flop circuit D F/F.1 generates a signal having a wave form shown in FIG. 2(*d*) and conducts it to the AND circuit $A_3$. The flip-flop circuit D F/F.2 gives forth a signal having a wave form shown in FIG. 2(*e*) at a time delayed to the same extent as the interval at which there is produced the clock pulse $\phi_2$. However, outputs from the flip-flop circuits D F/F.1 and D F/F.2 are inverted in wave form by an inverter I. The AND circuit $A_3$ generates output bearing a wave form shown in FIG. 2(*f*) for a length of time corresponding to the interval between output from the delay flip-flop circuit D F/F.1 and output from the delay flip-flop circuit D F/F.2. Upon receipt of said output T, the AND circuit $A_1$ produces output having a wave form shown in FIG. 2(*g*) during the same interval. Output from the AND circuit $A_1$ is supplied to the terminal *i* of the first bit flip-flop circuit SF–1 of the carry signal circuit means R. When the AND circuit $A_1$ gives forth zero output, the first bit flip-flop circuit SF–1 generates output having a wave form shown in FIG. 2(*h*) until the shift pulse $\phi_2$ arrives next time. Said output bearing the wave form of FIG. 2(*h*) is conducted as a carry signal $S_1$ through the OR circuit $O_3$ to a carry circuit (not shown). Upon arrival of the shift pulse $\phi_2$, the first bit flip-flop circuit SF–1 is reset and the second bit flip-flop circuit SF–2 is set to supply a carry signal bearing a wave form shown in FIG. 2(*i*) to the carry control circuit through the OR circuit $O_3$, thereby carrying the data contained in the arithmetic operation register by one order. Then the third bit flip-flop circuit SF–3 is set to generate a carry signal having a wave form shown in FIG. 2(*j*) at a time delayed to the same extent as the interval at which the clock pulse $\phi_2$ is generated. Accordingly, the OR circuit $O_3$ supplies a carry signal having a time width indicated by the wave form of FIG. 2(1) to the carry control circuit. When the third bit flip-flop circuit SF–3 is reset after producing output, the final bit flip-flop circuit SF–4 is set to generate a program processing signal $S_2$ having a wave form shown in FIG. 2(*k*) to carry out said processing. Upon completion of these three consecutive carry operations, there is automatically issued the succeeding function signal to process the input number portion "18,000 +" of an arithmetic expression by successive depression of the keys [1], [8] and [000].

Where the consecutive zero numbers represent two orders, there is depressed the two-zero key, output from which is supplied to the OR circuit $O_1$ and AND circuit $A_2$. As described in connection with the preceding embodiment of three zero numbers, output from the OR circuit $O_1$ passes through the input delay timing control circuit D and inverter I to the AND circuit $A_3$, output from which is supplied to the AND circuit $A_2$ together with the aforesaid input key signal. Signals having the wave forms indicated in FIG. 2 operate the carry signal circuit R at the intervals shown therein, together with output from the clock pulse generator G. In this embodiment of two zero numbers of the consecutive orders, there are operated the second and third bit flip-flop circuits SF–2 and SF–3 of the carry signal circuit R to generate a carry signal $S_1$ through the OR circuit $O_3$. Output from the third bit flip-flop circuit SF–3 sets the final bit flip-flop circuit SF–4. As in the preceding case, there is generated a program processing signal $S_2$ having the wave form of FIG. 2(k) to effect said processing.

The foregoing description relates to the separate operation of the three-zero and two-zero keys. While there may be provided a circuit for these two types of keys respectively, it is also possible to use a single circuitry covering the aforesaid two embodiments as illustrated in FIG. 1. Even such arrangement can be operated quite smoothly.

What is claimed is:

1. A number input device, comprising in combination:

a two-zero key;

a three-zero key;

counting devices operatively connected to said two-zero key and to said three-zero key;

an input number register;

means for supplying said input number register with a shift signal by operating said three-zero key and said two-zero key representing numbers of the orders of 1000 and 100, respectively, through a corresponding number of said counting devices connected to said keys;

means for effecting a prescribed arithmetic operation when said input number register completes shifting after receiving said shift signal; and said arithmetic operation being conducted by signals commanding a prescribed type of processing.

2. A number input device comprising, in combination:

a multizero key;

a counter operatively connected to said multizero key;

an input number register operatively connected to said counter;

means for left-shifting, by operating said multizero key, by an amount corresponding to the order of said multizero key, said left-shifting being accomplished by a shift signal which is fed as an input to said input number register through said counter; and means for automatically issuing a function command to be succeeded immediately after said input number register completes said left-shifting operation.

3. A number input device according to claim 2, wherein said multizero key comprises a three-zero key representing the order of 1,000.

4. A number input device according to claim 2, wherein said multizero key comprises a two-zero key representative of the order of 100.

* * * * *